(12) United States Patent
Artzner et al.

(10) Patent No.: US 10,649,204 B2
(45) Date of Patent: May 12, 2020

(54) DEVICE AND METHOD FOR DEFLECTING A LIGHT BEAM IN ORDER TO SCAN A SOLID ANGLE RANGE

(71) Applicant: Robert Bosch GmbH, Stuttgart (DE)

(72) Inventors: Johannes Artzner, Eningen (DE); Manuel Glueck, St. Johann (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 16/070,116

(22) PCT Filed: Nov. 30, 2016

(86) PCT No.: PCT/EP2016/079312
§ 371 (c)(1),
(2) Date: Jul. 13, 2018

(87) PCT Pub. No.: WO2017/121537
PCT Pub. Date: Jul. 20, 2017

(65) Prior Publication Data
US 2019/0033577 A1    Jan. 31, 2019

(30) Foreign Application Priority Data
Jan. 16, 2016 (DE) .................. 10 2016 200 502

(51) Int. Cl.
*G02B 26/08* (2006.01)
*G02B 26/10* (2006.01)

(52) U.S. Cl.
CPC ....... *G02B 26/101* (2013.01); *G02B 26/0816* (2013.01)

(58) Field of Classification Search
CPC .............. G02B 26/101; G02B 26/0858; G02B 2027/014; G02B 26/0841; G02B 26/10;
(Continued)

(56) References Cited

U.S. PATENT DOCUMENTS 5,187,364 A    2/1993  Blais
6,147,822 A    11/2000  Yamada et al.
(Continued)

FOREIGN PATENT DOCUMENTS

DE    19710714 C1    9/1998
DE    19812768 A1    9/1999
(Continued)

OTHER PUBLICATIONS

International Search Report for PCT/EP2016/079312, dated Mar. 2, 2017.

*Primary Examiner* — Euncha P Cherry
(74) *Attorney, Agent, or Firm* — Norton Rose Fulbright US LLP; Gerard Messina

(57) ABSTRACT

A device and a method for deflecting a light beam to scan a solid angle range. The device includes: a deflection device having an adjustable micromirror, which is configured to periodically deflect a light beam in accordance with an actuating signal, in order to periodically scan a solid angle range, using the micromirror; a control device to receive a control signal that indicates a currently preferred solid angle in the solid angle range to be scanned, and to generate the actuating signal based on the received control signal; and the control device is configured to generate the actuating signal so that a maximum of a location probability density of the periodically deflected light beam is situated at the solid angle.

11 Claims, 6 Drawing Sheets

(58) Field of Classification Search
CPC .............. G02B 26/105; G02B 27/0093; G02B 27/017; G02B 27/18; G02B 5/045; G02B 5/124; G02B 26/00; G01R 5/00; G09G 2320/0276; G09G 2320/0285; G09G 2320/043; G09G 2320/0626; G09G 3/001; G09G 3/025; H01J 5/16; H01L 41/042; H02N 2/0075; H04N 5/7416; H04N 5/7491; G03B 21/60
USPC ...................................................... 359/212.2
See application file for complete search history.

(56) References Cited

U.S. PATENT DOCUMENTS

| | | | |
|---|---|---|---|
| 2010/0079836 A1 | 4/2010 | Rothaar | |
| 2011/0249312 A1* | 10/2011 | Ishida | G02B 26/085 359/202.1 |
| 2014/0159620 A1 | 6/2014 | Yamamoto et al. | |

FOREIGN PATENT DOCUMENTS

| | | |
|---|---|---|
| DE | 102008055159 A1 | 7/2010 |
| DE | 102013225566 A1 | 6/2015 |
| DE | 102014220115 A1 | 4/2016 |
| JP | 2009210891 A | 9/2009 |
| JP | 2014029858 A | 2/2014 |
| JP | 2015194695 A | 11/2015 |

* cited by examiner

DEVICE AND METHOD FOR DEFLECTING A LIGHT BEAM IN ORDER TO SCAN A SOLID ANGLE RANGE

FIELD OF THE INVENTION

The present invention relates to a device and a method for deflecting a light beam, in particular, a laser beam, in order to scan a solid angle range.

BACKGROUND INFORMATION

Laser scanners are used for a multitude of applications, for example, for image projection, in headlights, or for scanning surrounding areas of vehicles. In this context, a laser scanner is to be understood, in particular, as a device, in which a laser beam is directed onto a deflection device and controlled by this, in accordance with an actuating signal, in such a manner, that the reflected laser beam scans a solid angle range of interest, e.g., a screen. Scanning is to be understood as covering the solid angle range or the screen in a traversing manner, for example, in zigzag patterns; a desired scanning density being able to be a function of the specific application.

By way of example, a laser scanner, as is explained in more detail in the following, in light of FIG. 6, is discussed in US 2010/079 836 A1. FIG. 6 shows a customary laser scanner 1, which includes a light source 2 that is configured to generate a laser beam 3 and direct it onto a micromirror 4. The laser beam 3 striking micromirror 4 is deflected, as a deflected laser beam 5, in the direction of a screen 6; micromirror 4 being controlled by a regulating device 7 so as to scan screen 6.

To that end, micromirror 4 rotates about a first axis of rotation, which may also be referred to as a rapid axis of rotation, so that screen 6 is traversed in a horizontal direction from left to right and back again in a periodic manner. In addition, micromirror 4 rotates about a second axis of rotation, which may also be referred to as a slow axis of rotation, in such a manner, that light beam 5 traverses screen 6 periodically from top to bottom and back again. The zigzag pattern shown in FIG. 6 results from superimposing the movements about the first and the second, that is, the slow and the rapid, axes of rotation. Regulating device 7 receives position signals 8, which indicate a respective position of deflection device 4, and, on the basis of them, adapts control signals 9 for controlling deflection device 4.

The scanning is normally implemented in a periodic, in particular, a sinusoidal, motion, as represented, for example, in FIG. 7. FIG. 7 shows a graph, which represents a deflection angle α of a micromirror 4 as a function of time t within one period, in the form of a sine function. In the case of a motion as shown in FIG. 7, maxima of a location probability density for the deflected light beam result in accordance with the deflection angle of micromirror 4, as shown in FIG. 8. Accordingly, there are maxima of the location probability density at the maximum deflection angle in the negative direction, $\alpha_{min}$, as well as at the maximum deflection angle in the positive direction, $\alpha_{max}$.

SUMMARY OF THE INVENTION

The present invention provides a device having the features described herein and a method having the features described herein.

Accordingly, a device for deflecting a light beam, in order to scan a solid angle range, is provided, including: a deflection device having an adjustable micromirror, which is configured to deflect a light beam in accordance with an actuating signal, in order to periodically scan a solid angle range, using the micromirror; a control device, which is configured to receive a control signal that indicates a currently preferred solid angle in the solid angle range to be scanned; the control device further being configured to generate the actuating signal for the deflection device on the basis of the received control signal; and the control device being configured to generate the actuating signal in such a manner, that a maximum of a location probability density of the periodically deflected light beam is situated at the currently preferred solid angle. In particular, this is achieved in that a location probability density and/or residence time of the micromirror at a deflection angle corresponding to the preferred solid angle, as well as in a range of deflection angles about the corresponding deflection angle, determined by a half width b of the maximum, is increased in comparison with conventional laser scanners.

The control device may be configured to generate the control signal in such a manner, that the maximum has a predefined and/or adjustable width, in particular, half width, of the density of the location probability density.

The solid angle currently preferred is to be understood as the solid angle, at which, during the course of a period of the periodic scanning, the greatest level of available optical power, the so-called light center, should be directed. This may be, for example, a solid angle, at which an object of interest is situated, and which should be scanned with a particularly high reliability. A location probability density is to be understood as a function, which indicates a probability of the light beam per differential solid angle (or angle), so that integration of the location probability density over the entire solid angle range (or angular range) yields one.

A solid angle range and a preferred solid angle in it may also be understood as a deflection angle range and a preferred deflection angle in it, for example, if the deflection device is configured only to deflect the light beam in accordance with a single axis of rotation.

In addition, a method for deflecting a light beam, in order to scan a solid angle range, is provided with the steps: deflecting a light beam in accordance with an actuating signal, in order to periodically scan a solid angle range; receiving a control signal, which indicates a currently preferred solid angle in the solid angle range to be scanned; and generating the actuating signal on the basis of the received control signal, in such a manner, that a maximum of a location probability density of the, in particular, periodically deflected light beam is situated at the preferred solid angle.

The control signal may be generated in such a manner, that the maximum has a predefined and/or adjustable width, in particular, half width, of the density of the location probability density.

The finding underlying the present invention is that in the case of conventional light scanning systems, the location probability density of the light beam deflected for the scanning is always unchangeable at the reversal points or reversal zones, that is, at the edges of the solid angle range to be scanned, where, however, the objects of most interest within the solid angle range are rarely expected to be.

Now, the idea forming the basis of the present invention is to take this finding into account and to provide a device and a method to deflect a light beam for scanning a solid angle range, which allow the maximum of the location probability density of the deflected light beam to be set arbitrarily within the solid angle range to be scanned, and to be changed as required. In this manner, maxima of the light distribution over the to-be-scanned solid angle range of the light, which is deflected by the device or in accordance with the method, may be shifted away, as needed, from the edges of the solid angle range to be scanned.

Advantageous specific embodiments and further refinements are derived from the dependent claims, as well as from the specification, with reference to the figures.

According to one further refinement, the control device is configured to generate and/or adapt the actuating signal in such a manner, that in at least one first section of its periodic domain, an angular velocity function of the micromirror includes, or is made up of, a first term constant in time and a first term periodic in time. The angular velocity function of the micromirror indicates an angular velocity of the micromirror as a function of a time within a period of the periodic scanning. The time within the period may be specified as a fraction of a period duration T of the period. In other words, the angular velocity function indicates the angular velocity (magnitude and direction), which the micromirror has during its motion, in each instance, sequentially from a starting point (at a time t=0), via its maximum positive deflection (or maximum negative deflection) at a time t=T/4, via the starting point again at a time t=T/2, via a maximum negative deflection (or maximum positive deflection) at a time t=¾ T, back to the starting point at t=T or, again, t=0, in accordance with the periodic motion.

A term periodic in time should be understood as a term, which is describable by a periodic function, in particular, a trigonometric function, particularly, by a sine or cosine function, even if a complete period of the periodic function (which may be different from the period of the periodic scanning of the micromirror) is not run through within the specific section of the domain.

In other words, a deflection angle function of the micromirror, which indicates a deflection angle of the micromirror as a function of time t within the period of the periodic scanning, includes, in at least the first section of the periodic domain, a term linear in time (whose derivative with respect to time yields the first term of the angular velocity function constant in time) and a periodic term (whose derivative with respect to time yields the first term of the angular velocity function periodic in time), or is made up them. This yields an advantageous form of the location probability density of the light beam periodically deflected.

According to an additional further refinement, the control device is also configured to generate the control signal in such a manner, that in a second section of its periodic domain, the angular velocity function of the micromirror includes, or is made up of, a second term constant in time and a second term periodic in time. The first and the second portions are each disjoint, as are all of the further sections of the domain described in the following, as well. The first term constant in time may differ from the second term constant in time, and the first term periodic in time may differ from the second term periodic in time, namely, even without taking into account the different sections of the domain. The domain may be covered completely by the first and the second sections, that is, be made up of them. At any transition between the first and the second section (and/or vice versa), the angular velocity function may change abruptly.

According to an additional further refinement, the angular velocity function in the first section is equal to the angular velocity function in the second section, multiplied by negative one, if the argument of the angular velocity function in the first section is multiplied by negative one. In other words, the angular velocity function in the first section may be referred to as a point reflection, at the coordinate origin, of the angular velocity function in the second section. This yields a further advantageous form of the location probability density of the light beam deflected periodically.

According to an additional further refinement, a third section of the periodic domain is defined at a first transition between the first section and the second section of the periodic domain of the angular velocity function, and a fourth section of the periodic domain is defined at a second transition between the second section and the first section of the periodic domain. In the third section, the angular velocity function of the micromirror is a continuous function and may include a first term linear in time t or, particularly, is made up of a first-order polynomial in time. In the fourth section, the angular velocity function of the micromirror is a continuous function and includes a second term linear in time t or, particularly, is made up of a first-order polynomial in time. Due to this, the movements of the micromirror are less abrupt, which allows gentler operation of the device.

According to another further refinement, the angular velocity function assumes the value of zero once in the third section, and/or the angular velocity function assumes the value of zero once in the fourth section. In other words, during its periodic motion to scan the solid angle range periodically, in each instance, the micromirror is controlled, in the region of its reversal points, in accordance with an angular velocity function having a linear term, in particular, made up of a first-order polynomial in time t. In this manner, particularly gentle control of the micromirror may be implemented.

According to another further refinement, the control signal further indicates a half width of a peak of the location probability density of the periodically deflected light beam about the maximum situated at the preferred solid angle. The control device is advantageously configured to adapt the actuating signal to the forming of the peak of the location probability density having the half width indicated by the control signal.

According to another further refinement, the device includes a provision device, which is configured to generate the light beam in accordance with a light-provision control signal. The control signal advantageously indicates a desired light intensity of the light beam at the preferred solid angle, as well. The control device may be configured to generate the light-provision control signal on the basis of the light intensity indicated by the control signal. Thus, a light distribution in the solid angle range may be adapted even more precisely to varied requirements.

According to an additional further refinement, the control device is configured to generate the actuating signal in such a manner, that the micromirror is deflected, in particular, in a parabolic motion, in order to deflect the light beam over boundaries of the solid angle range to be scanned.

The method of the present invention is implementable by, in particular, the device of the present invention, and is therefore adaptable in accordance with all of the modifications and further refinements described with reference to the device of the present invention.

The present invention is explained in greater detail in the following, with reference to the exemplary embodiments depicted in the schematic figures of the drawings.

Unless otherwise indicated, identical or functionally equivalent elements and devices are provided with the same reference numerals in all of the figures. The numbering of method steps is used for clarity, and unless otherwise indicated, does not imply, in particular, a certain chronological order. In particular, a plurality of method steps may also be implemented simultaneously.

DETAILED DESCRIPTION

Figure 1:
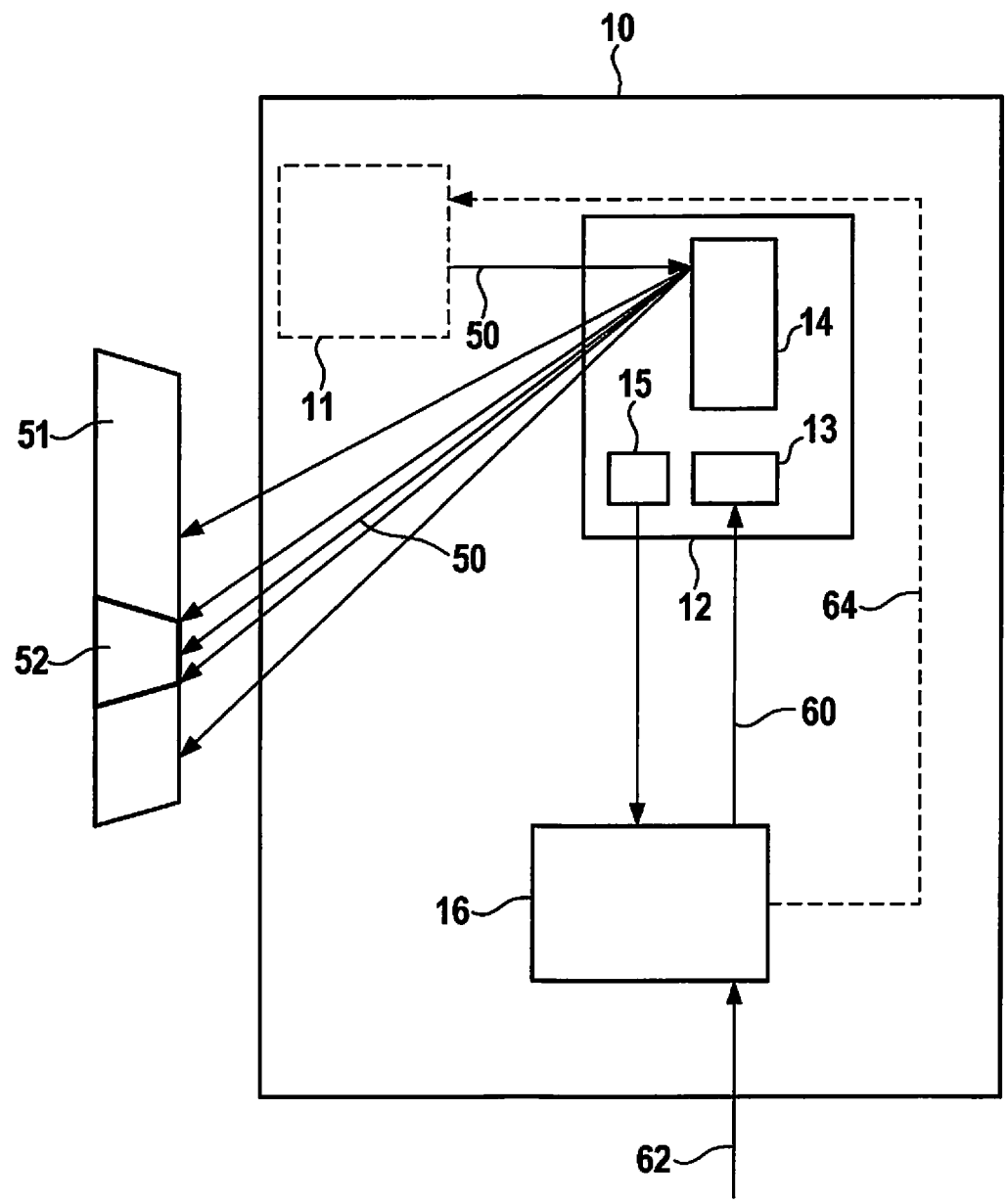
FIG. 1 shows a schematic block diagram of a device to deflect a light beam for scanning a solid angle range, according to one specific embodiment of the present invention.

FIG. 1 shows a schematic block diagram of a device 10 to deflect a light beam 50 for scanning a solid angle range 51, according to a specific embodiment of the present invention.

Device 10 includes a deflection device 12, which has a micromirror 14 and an actuator 13, with the aid of which micromirror 14 is deflectable, in order to deflect a light beam 50 for periodically scanning a solid angle range 51. Actuator 13 may be configured to move micromirror 14 in quasi-static or in resonant operation. The moving of micromirror 14 may include rotation of micromirror 14 about one or more axes of rotation. Alternatively, or in addition, the moving of micromirror 14 may also include deformation of micromirror 14, in particular, of a reflecting surface of micromirror 14. Deflection device 12 is configured to deflect light beam 50 in accordance with an actuating signal 60, in order to periodically scan solid angle range 51 with the aid of micromirror 14.

Device 10 may include a provision device 11, which is configured to provide light beam 50 and direct it to deflection device 12. For example, provision device 11 may include, or be made up of, a light source or a device for coupling a light beam 50 externally generated into device 10. In addition, provision device 11 may include, for example, a number of optical elements, for example, lenses, diaphragms, optical fiber lines, and the like. Alternatively, by positioning device 10 relative to an external light beam, an externally generated light beam in the form of light beam 50 may also be directed onto deflection device 12. Light beam 50 may be a laser beam. The light beam 50 provided, in particular, a laser beam, strikes deflection device 12 and is deflected by micromirror 14 in accordance with a current position, that is, alignment, or a current deformation, of micromirror 14. Light beam 50 may be provided with a light intensity temporally constant over at least one period of the scanning.

Device 10 further includes a control device 16, which is configured to receive an external or internal control signal 62 that indicates a currently preferred solid angle 52 in the solid angle range 51 to be scanned. Solid angle range 51 to be scanned may be, in particular, a one-dimensional deflection angle range, that is, a deflection angle range describable by a deflection angle as a single parameter, if, namely, e.g., adjustable micromirror 14 is rotatable about only one single axis of rotation. An external control signal 62 may indicate, for example, requests of a further device, e.g., requests of a headlight control system, a lidar system, or the like.

In the following, for reasons of clarity, in the description, focus is given partially to a deflection angle range to be scanned as a subtype of a solid angle range to be scanned, as well as to a currently preferred deflection angle in the deflection angle range to be scanned, as a subtype of the solid angle currently preferred. It should be understood that the principles and modifications described here, as well as the described forms of construction of device 10, may equally be used for scanning a solid angle range.

In order to scan a solid angle range, for example, the light beam 50 to be deflected may scan, that is, sweep over or screen, an azimuthal angle range and an elevation angle range periodically; the solid angle range 51 to be scanned being scanned by superimposing the azimuthal angular motion and the elevational angular motion of deflected light beam 50. By setting a currently preferred azimuthal deflection angle in the azimuthal angle range to be scanned and a currently preferred elevation deflection angle in the elevation angle range to be scanned, currently preferred solid angle 52 may be defined as the solid angle, which is reached by deflected light beam 50, when light beam 50 is deflected both at the preferred azimuthal deflection angle and at the preferred elevational deflection angle.

Control device 16 is further configured to generate actuating signal 60 on the basis of received control signal 62. By that, it should be understood that control device 16 is able to check received control signal 62 in real time, continuously or regularly, and, in each instance, to adapt generated actuating signal 60 continuously to currently received control signal 62. Consequently, a change in currently preferred solid angle 52 may always be carried out immediately with particularly little delay. Control device 16 is configured to generate and/or adapt actuating signal 60 in such a manner, that a maximum of a location probability density of periodically deflected light beam 50 is situated at currently preferred solid angle 52. In a manner analogous to the location probability density of periodically deflected light beam 50, a location probability density of adjustable micromirror 14 may also be considered a function of deflection angles of adjustable micromirror 14 within the deflection angle range of micromirror 14, between a maximum positive deflection and a maximum negative deflection.

Deflection device 12 may further include a detector 15, which is configured to ascertain an angular position, that is, a deflection angle, and/or an angular velocity of micromirror 14, and to output a feedback signal on the basis of it. The feedback signal may be transmitted to control device 16; control device 16 being able to function in a regulating mode (closed-loop operation with feedback) on the basis of the feedback signal. In this case, control device 16 may also be referred to as a regulating device or include an automatic controller.

Different variants of the manner, in which control device 16 may be configured for generating actuating signal 60, are explained in light of the following FIGS. 2 through 5. In the context of descriptions of device 10 according to the present invention, it should be understood that a description of the analogous method of the present invention, which is adaptable to all of the further refinements, modifications and variants described with regard to device 10, is always given, as well. In the description of FIGS. 2 through 5, another simplifying assumption is made, that deflection device 12 is configured in such a manner, that the deflection angle of light beam 50 corresponds to the deflection angle of micromirror 14. Of course, deflection device 12 may also include further optical elements, such as additional micromirrors, etc. Accordingly, the deflection angle of light beam 50 may also differ from the deflection angle of micromirror 14 in a defined manner.

According to one possible specific embodiment of the present invention, which is explained below in light of FIGS. 2 and 3, regulating device 16 is configured to generate actuating signal 60 in such a manner, that a deflection angle function of micromirror 14, having the value α(t), is of the following form:

$$\alpha(t) = \alpha_{max}\left[a_0 \frac{t}{\frac{T}{4}} - a_1 \sin\left(\frac{2\pi}{T}t - \alpha_0\right)\right],$$

if time t is in a first section 71 of periodic domain 75 of the periodic scanning; first section 71 being situated between t=−T/4 and t=T/4 (that is, t=¾ T and t=T/4). In this connection, T represents the period of the periodic scanning, $\alpha_{max}$ is a (maximum) deflection amplitude of the micromirror, and a0, a1 and $\alpha_0$ are adjustable parameters. Furthermore, regulating device 16 is configured to generate actuating signal 60 in such a manner, that the deflection angle function of micromirror 14, having the value α(t), is of the following form:

$$\alpha(t) = -\alpha_{max}\left[a_0 \frac{t}{\frac{T}{4}} - a_1 \sin\left(\frac{2\pi}{T}t + \alpha_0\right)\right],$$

if time t is in a second section 72 of periodic domain 75 of the periodic scanning; second section 72 being situated between t=T/4 and t=¾ T. Thus, in second section 72, the deflection angle function is derived from the deflection angle function in first section 71, using axial reflection at the t=0 axis.

Consequently, in first section 71, an angular velocity function α̇(t) is given, according to actuating signal 60, by:

$$\dot{\alpha}(t) = \alpha_{max}\left[a_0 \frac{1}{\frac{T}{4}} - a_1 \frac{2\pi}{T}\cos\left(\frac{2\pi}{T}t - \alpha_0\right)\right],$$

and in second section 72, by:

$$\dot{\alpha}(t) = -\alpha_{max}\left[a_0 \frac{1}{\frac{T}{4}} - a_1 \frac{2\pi}{T}\cos\left(\frac{2\pi}{T}t + \alpha_0\right)\right].$$

That is to say, angular velocity function α̇(t) in first section 71 is the angular velocity function α̇(t) in second section 72, point-reflected at the coordinate origin; the point reflection being characterized by f(t)=−f(−t).

Figure 2:
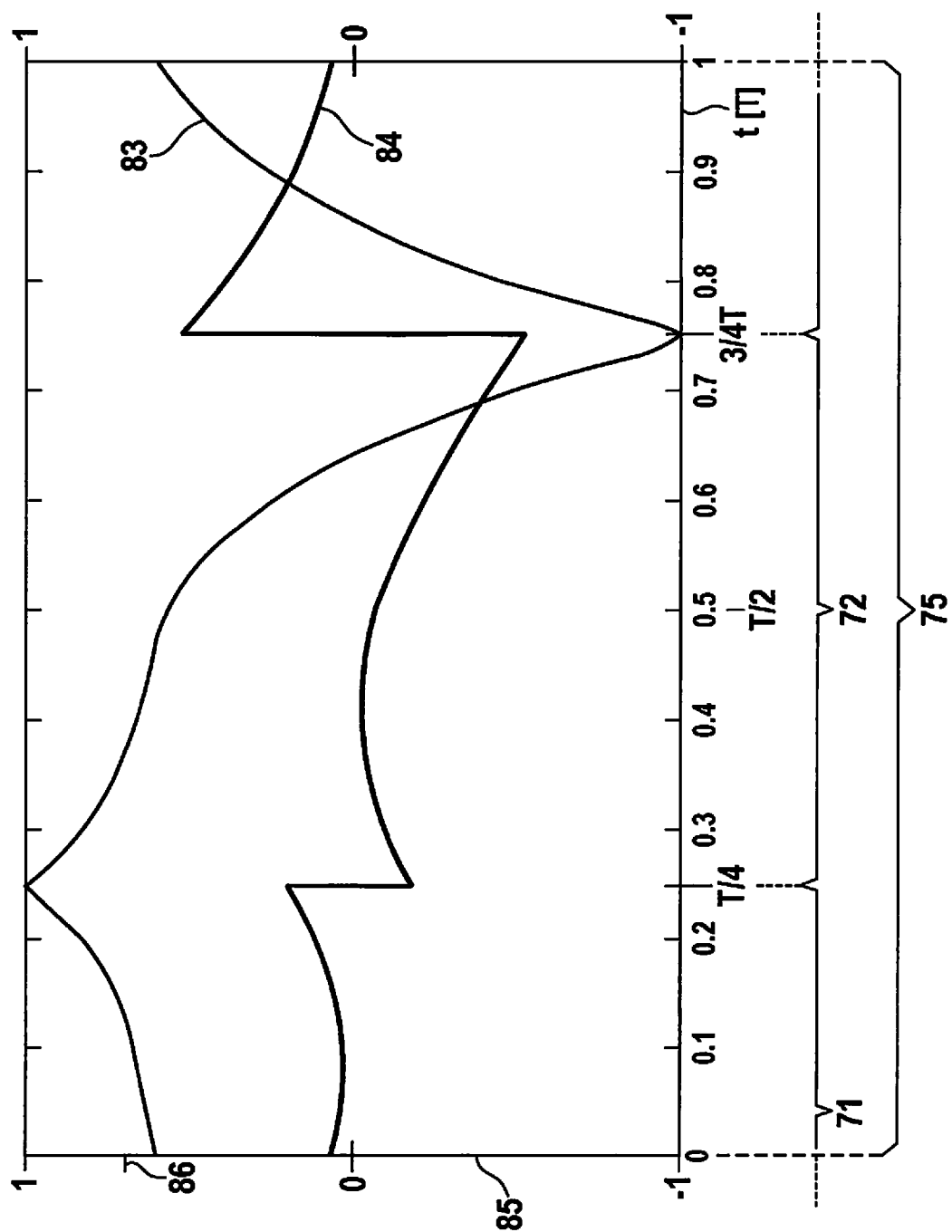
FIG. 2 and FIG. 3 show schematic graphs for explaining a possible method of functioning of the device from FIG. 1.

FIG. 2 shows a schematic graph, which represents a normalized deflection angle function 83 of light beam 50 or, analogously, the deflection angle function of micromirror 14, as a function of time t, within one period of the periodic scanning, as well as an angular velocity function 84 of light beam 50 or, analogously, of micromirror 14, as a function of time t, within the same period, in accordance with the above formulas. A left vertical axis shows the normalized deflection angle of micromirror 14, which, in the present specific embodiment, is equal to a normalized deflection angle 85 of light beam 50. Currently preferred deflection angle 86 is drawn in on the left vertical axis, as an example.

Figure 3:
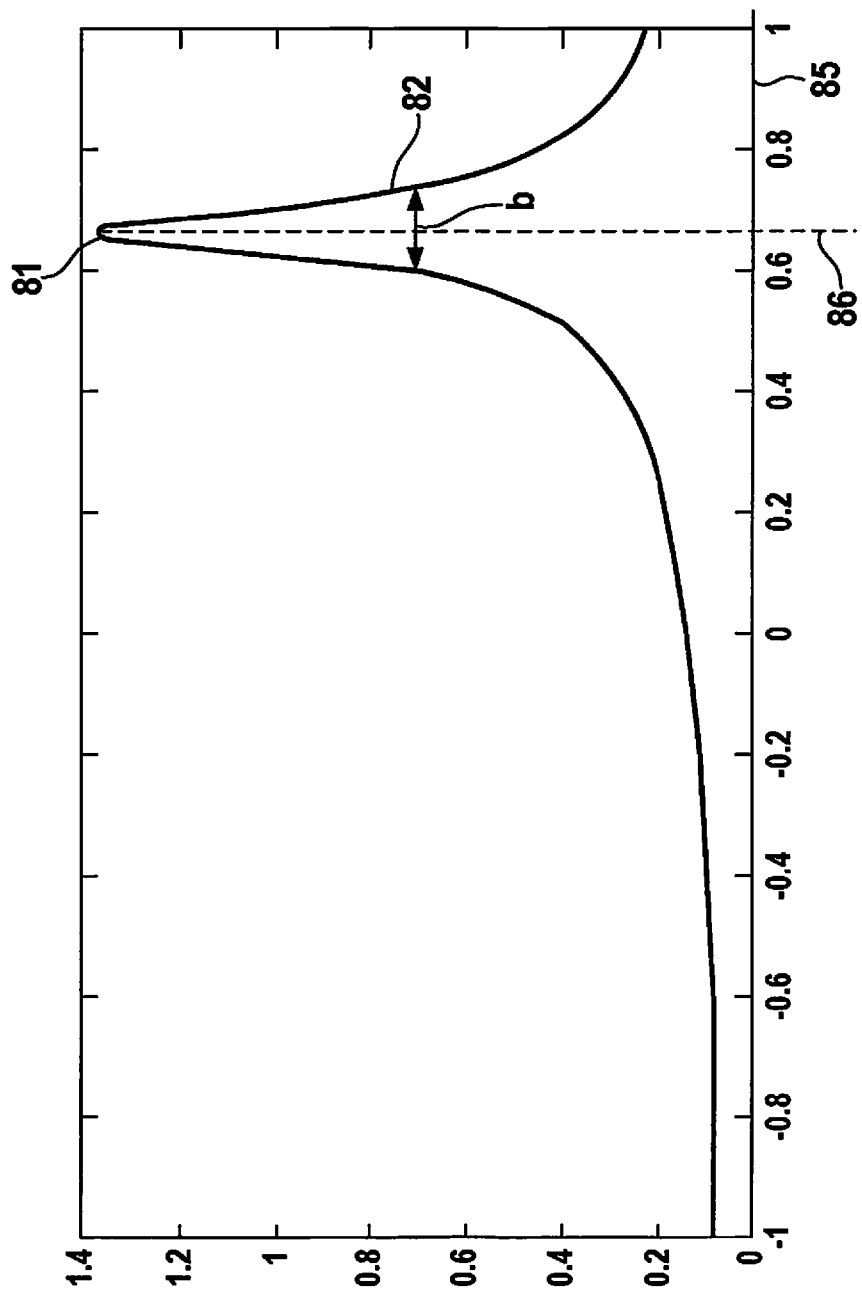

FIG. 3 shows a schematic graph, which includes a location probability density 82 of light beam 50 as a function of normalized deflection angle 85 of light beam 50. As is apparent from FIG. 3, according to the formulas given above, actuating signal 60 results in a maximum 81 of location probability density 82 at currently preferred deflection angle 86; maximum 81 being surrounded by a peak having a half width b.

To that end, parameter $\alpha_0$ introduced above may be selected as the arcsine of a preferred shift of maximum 81 from the center of the deflection angle range on; the shift lying between −1 and 1, corresponding to a shift of maximum 81 between a maximum negative deflection and a maximum positive deflection of light beam 50, and corresponding to a maximum negative deflection of micromirror 14 and a maximum positive deflection of micromirror 14.

The remaining parameters may be determined from specified boundary conditions:

$$a_1(\gamma, \alpha_0) = \frac{1}{\frac{\pi}{2}\gamma - \cos(\alpha_0)},$$

$$a_0(\gamma, \alpha_0) = \frac{\pi}{2}\gamma \frac{1}{\frac{\pi}{2}\gamma - \cos(\alpha_0)}.$$

In this connection, γ is a light intensity parameter of light beam 50, which may be adjustable with the aid of provision device 11 of device 10. Light intensity parameter γ may be parameterized as $$\gamma = \frac{\gamma_0 \cdot \left(\frac{\pi}{2} - \cos(\alpha_0)\right) - (1 - \cos(\alpha_0))}{\frac{\pi}{2} - 1},$$

where $\gamma_0$ is a set or adjustable light intensity parameter at the light center, that is, at maximum 81 of location probability density 82 of light beam 50. Parameter $\gamma_0$ may be set with the aid of provision device 11. To that end, external control signal 62 may indicate a currently desired value for parameter $\gamma_0$. Computing device 16 may be configured to generate or adapt a light-provision control signal 64 on the basis of the value of parameter $\gamma_0$ indicated in accordance with control signal 62, and to transmit it to provision device 11. Provision device 11 may optionally be configured to generate light beam 50 in accordance with light-provision control signal 64, in order to produce or adapt light intensity parameter γ of light beam 50 accordingly (see FIG. 1).

Further values for adjustable parameters may be indicated by external control signal 62, in particular, for frequency 1/T of the periodic scanning and for deflection amplitude $\alpha_{max}$ of micromirror 14. In the same way, using external control signal 62, a desired half width b for the peak formed about maximum 81 of location probability density 82 may be indicated, and the actuating signal 60 for forming it may be generated or adapted.

Half width b is influenced considerably by light intensity parameter γ. Since the area underneath the location probability density from FIG. 3 corresponds to a value of one, the height of maximum 81 is also indirectly determined by half width b of the peak, and consequently by light intensity parameter γ. The greater the half width b of the location probability density, the lower the peak. Alternatively or additionally, a desired value of maximum 81, which may be, in particular, an absolute or global maximum, may also be transmitted to provision device 11 and/or control device 16, in order to generate the maximum 81 having the desired value.

In one variant, light-provision control signal 64 may be generated and/or adapted so that provision device 11 generates the light beam 50 having a temporally modulated light intensity, in such a manner, that maximum 81 of location probability density 82 is situated at preferred solid angle 52 by a combination of deflecting light beam 50 in accordance with actuating signal 60, with generating light beam 50 in accordance with light-provision control signal 64. Alternatively, light beam 50 is provided to have a light intensity temporally constant over at least one period of the scanning.

Figure 4:
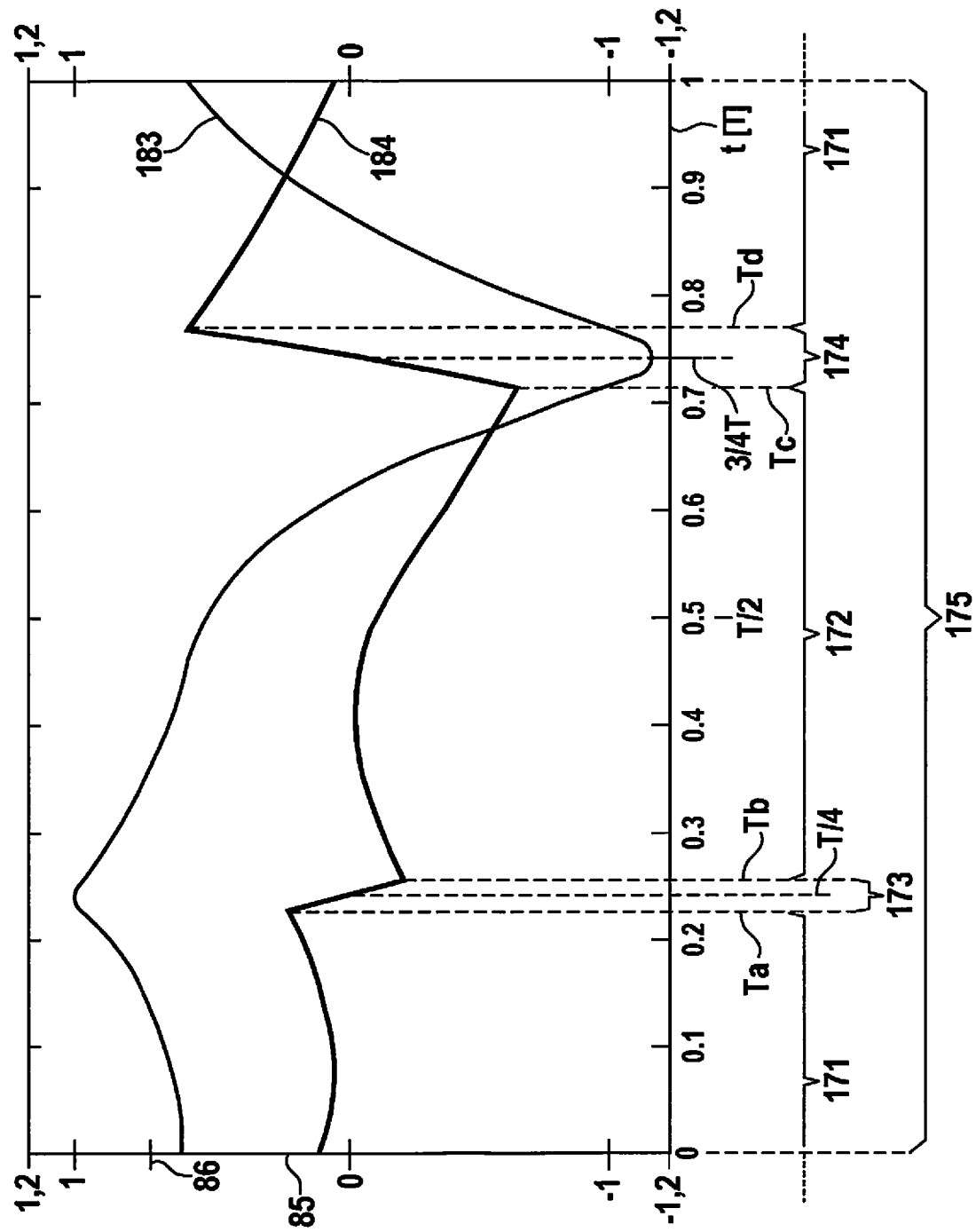
FIG. 4 shows a schematic graph for explaining a further possible method of functioning of the device from FIG. 1.

A further possible functioning method of the device from FIG. 1 is explained with the aid of the following FIG. 4.

In the case of the further possible method of functioning, in a first section 171 of periodic domain 175, an angular velocity function 184 of micromirror 14 is given in accordance with actuating signal 60, by:

$$\dot{\alpha}(t) = \alpha_{max}\left[a_0 \frac{1}{\frac{T}{4}} - a_1 \frac{2\pi}{T}\cos\left(\frac{2\pi}{T}t - \alpha_0\right)\right],$$

first section 171 extending between a time t=Td, which lies between t=¾ T and t=T (or t=0), and a time t=Ta, which lies between t=0 and t=T/4. In a second section 172 of periodic domain 175, which extends between a time t=Tb, which lies between t=T/4 and t=T/2, and a time t=Tc, which lies between t=T/2 and t=¾ T, angular velocity function 184 is given in accordance with actuating signal 60, by:

$$\dot{\alpha}(t) = -\alpha_{max}\left[a_0 \frac{1}{\frac{T}{4}} - a_1 \frac{2\pi}{T}\cos\left(\frac{2\pi}{T}t + \alpha_0\right)\right],$$

that is, by the negative of angular velocity function 184 in first section 171.

Between first and second sections 171, 172, a third section 173 is defined between times Ta and Tb, and a fourth section 174 is defined between times Tc and Td. In third and fourth sections 173, 174, the angular velocity of the micromirror does not change stepwise, as between the first and second sections 171, 172 shown in FIGS. 2 and 3, but with a linear path of the function, and it experiences, in particular, a sign change. This produces a smooth deflection angle function 183 of light beam 50, as shown in FIG. 4. The definitions of angular velocity function 184 in third section 173 and fourth section 174 are selected to produce an altogether continuous, albeit not generally continuously differentiable, angular velocity function 184, as shown in FIG. 4. In this context, micromirror 14 may be deflected across boundaries of the solid angle range 51 to be scanned, which are denoted by the values 1 and −1 on the left vertical axis in FIG. 4.

Figure 5:
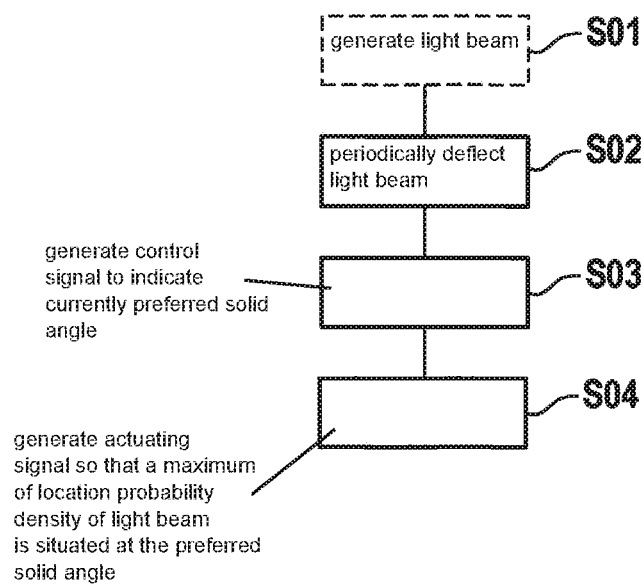
FIG. 5 shows a schematic flow chart for explaining a method to deflect a light beam for scanning a solid angle range, according to another further specific embodiment of the present invention.
Figure 6:
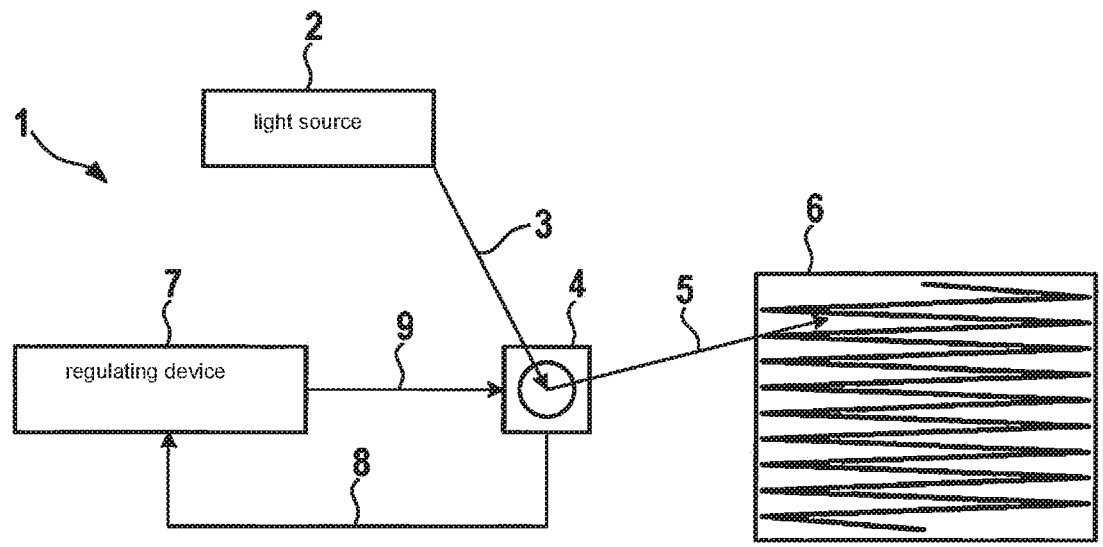
FIG. 6 shows a schematic representation of a conventional laser scanner.
Figure 7:
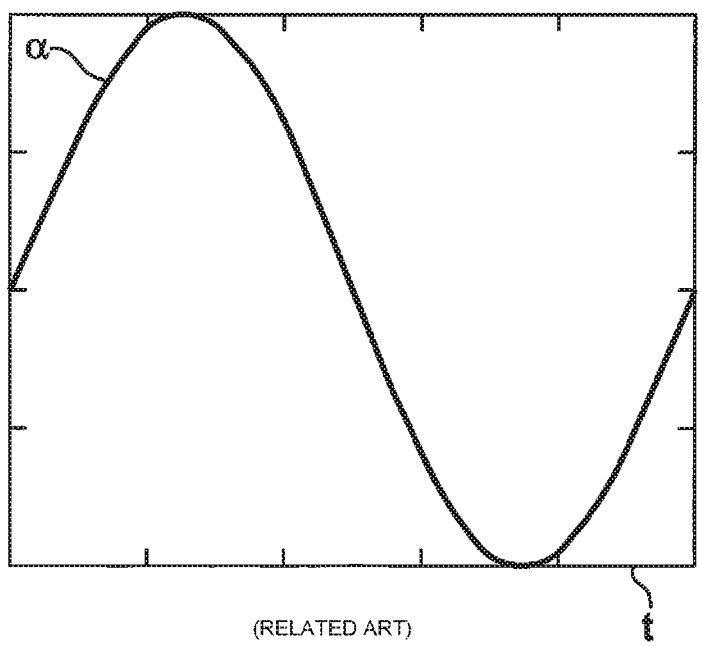
FIG. 7 and FIG. 8 show schematic graphs for explaining the function of the conventional laser scanner from FIG. 6.
Figure 8:
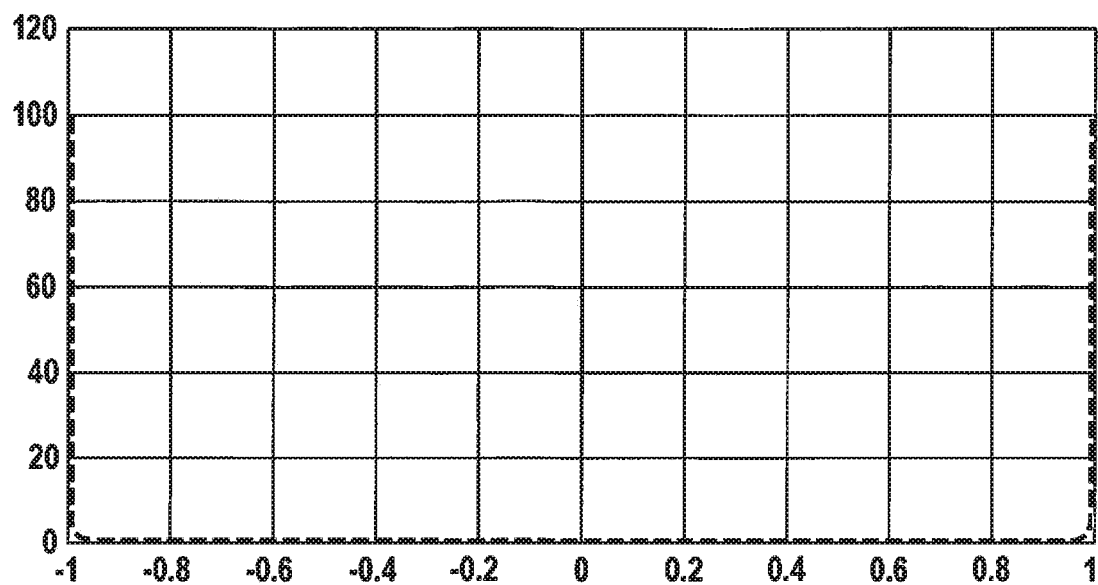

FIG. 5 shows a schematic flow chart for explaining a method to deflect a light beam 50 for scanning a solid angle range 51, according to another further specific embodiment of the present invention.

The method of the present invention according to FIG. 5 is implementable, using, in particular, the device 10 of the present invention, and is therefore adaptable, in particular, to all of the modifications and further refinements described with reference to the device 10 of the present invention, in particular, to the specific form of angular velocity functions 84; 184.

In a step S02, a light beam 50 is periodically deflected according to an actuating signal 60, in order to scan a solid angle range 51 periodically. In an optional step S01, the light beam 50 used for that may be provided, in particular, generated, by a provision device 11, to have a light intensity temporally constant over at least one period of the scanning. In a step S03, a control signal 62, which is, in particular, externally generated and indicates a currently preferred solid angle 52 in the solid angle range 51 to be scanned, is received. In a step S04, actuating signal 60 is generated on the basis of received control signal 62 in such a manner, that a maximum 81 of a location probability density 82 of periodically deflected light beam 50 is situated at preferred solid angle 52. This may be accomplished, in particular, as described above with reference to FIGS. 2 through 4.

As described with regard to device 10, the method may include, as an optional step, generating a light-provision control signal 64 on the basis of a light intensity at preferred solid angle 52, indicated by control signal 62, and controlling provision device 11 with the aid of generated light-provision control signal 64. In addition, the method may include, as an optional step, generating or adapting actuating signal 60 on the basis of a half width b for a peak of location probability density 82 of light beam 50 about maximum 81, the half width being indicated by control signal 62.

What is claimed is:

1. A device for deflecting a light beam to scan a solid angle range, comprising:
    a deflection device, having an adjustable micromirror, to periodically deflect a light beam in accordance with an actuating signal, to periodically scan a solid angle range, using the micromirror; and
    a control device to receive a control signal that indicates a currently selected solid angle in the solid angle range to be scanned, and to generate the actuating signal based on the received control signal; and
    wherein the control device is configured to generate the actuating signal so that a maximum of a location probability density of the periodically deflected light beam is situated at the selected solid angle by varying, during at least one period of the periodic scan, an angular velocity of the micromirror;
    wherein the control device generates, for the at least one period, the actuating signal in such a manner that, based on the actuating signal, a first angular velocity of the micromirror while scanning within the selected solid angle is different than a second angular velocity of the micromirror while scanning within the solid angle range outside the selected solid angle, the first angular velocity being slower than the second angular velocity;
    wherein the location probability density is a function which indicates a probability of the light beam per differential solid angle so that integration of the location probability density over the entirety of the solid angle range yields one.

2. The device of claim 1, wherein the control device is configured to generate the actuating signal so that in at least one first portion of each period of the at least one periods, a first angular velocity function of the micromirror, which indicates the angular velocity of the micromirror during the first portion as a function of time, includes a first term constant in time and a first term periodic in time.

3. The device of claim 2, wherein the control device is configured to generate the actuating signal so that in a second portion of each period of the at least one period, a second angular velocity function of the micromirror, which indicates the angular velocity of the micromirror during the second portion as a function of time, includes a second term constant in time and a second term periodic in time.

4. The device of claim 3, wherein the angular velocity function in the first portion is equal to the angular velocity function in the second portion multiplied by negative one.

5. The device of claim 3, wherein a third portion of each period of the at least one period is at a first transition between the first portion and the second portion; and a fourth portion of each period of the at least one periods is at a second transition between the second portion and the first portion; a third angular velocity function of the micromirror, which indicates the angular velocity of the micromirror during the third portion as a function of time, is a continuous function; and/or a fourth angular velocity function of the micromirror, which indicates the angular velocity of the micromirror during the fourth portion as a function of time, is a continuous function.

6. The device of claim 5, wherein the third angular velocity function is a value of zero once, and/or the fourth angular velocity function is the value of zero once.

7. The device of claim 1, wherein the control signal further provides to the control device an indication of a half width of a peak of the location probability density of the periodically deflected light beam surrounding the maximum situated at the selected solid angle; and to form the peak of the location probability density, the control device is configured to adapt the actuating signal, using the half width indicated by the control signal.

8. The device of claim 1, further comprising:
a provision device to generate the light beam in accordance with a light-provision control signal; the control signal further indicating a selected light intensity of the light beam at the selected solid angle;

wherein the control device is configured to generate the light-provision control signal based on the light intensity indicated by the control signal.

9. The device of claim 1, wherein the control device is configured to generate the actuating signal so that the micromirror is deflected to deflect the light beam across boundaries of the solid angle range to be scanned.

10. A method for deflecting a light beam to scan a solid angle range, the method comprising:
periodically deflecting, by a micromirror, a light beam in accordance with an actuating signal to periodically scan a solid angle range;
receiving a control signal, which indicates a currently selected solid angle in the solid angle range to be scanned; and
generating the actuating signal based on the received control signal so that a maximum of a location probability density of the deflected light beam is situated at the selected solid angle by varying, during a least one period of the periodic scan, an angular velocity of the micromirror during the scanning of the solid angle range;
wherein the generating includes generating, for the at least one period, the actuating signal in such a manner that, based on the actuating signal, a first angular velocity of the micromirror while scanning within the selected solid angle is different than a second angular velocity of the micromirror while scanning within the solid angle range outside the selected solid angle, the first angular velocity being slower than the second angular velocity;
wherein the location probability density is a function which indicates a probability of the light beam per differential solid angle so that integration of the location probability density over the entirety of the solid angle range yields one.

11. The device as recited in claim 3, wherein the first term constant in time differs from the second term constant in time and/or the first term period in time different from the second term periodic in time.

\* \* \* \* \*